United States Patent
Xie et al.

(10) Patent No.: US 8,774,574 B2
(45) Date of Patent: Jul. 8, 2014

(54) OPTICAL TIME DOMAIN REFLECTOMETRY FOR MULTIPLE SPATIAL MODE FIBERS

(75) Inventors: Chongjin Xie, Morganville, NJ (US); Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 215 days.

(21) Appl. No.: 13/477,341

(22) Filed: May 22, 2012

(65) Prior Publication Data
US 2013/0315532 A1 Nov. 28, 2013

(51) Int. Cl.
  *G02B 6/26* (2006.01)
  *H04B 10/13* (2006.01)
(52) U.S. Cl.
  USPC ............. 385/28; 398/143; 398/162; 398/170
(58) Field of Classification Search
  USPC ........ 385/12, 24, 28; 398/143, 162, 169, 170, 398/200, 214
  See application file for complete search history.

(56) References Cited

U.S. PATENT DOCUMENTS

| | | | | |
|---|---|---|---|---|
| 5,194,847 | A * | 3/1993 | Taylor et al. | 340/557 |
| 6,256,090 | B1 * | 7/2001 | Chen et al. | 356/73.1 |
| 7,030,971 | B1 * | 4/2006 | Payton | 356/35.5 |
| 7,440,158 | B2 | 10/2008 | Giles et al. | |
| 7,639,909 | B2 * | 12/2009 | Murshid et al. | 385/31 |
| 7,844,144 | B2 * | 11/2010 | Kahn et al. | 385/15 |

OTHER PUBLICATIONS

Ryf, R., et al., "Optical Coupling Components for Spatial Multiplexing in Multi-Mode Fibers", ECOC Technical Digest 2011 OSA, 3 pages.

* cited by examiner

*Primary Examiner* — Daniel Petkovsek
(74) *Attorney, Agent, or Firm* — Hitt Gaines, PC

(57) ABSTRACT

An apparatus includes an N×1 spatial mode multiplexer, an optical source and an optical receiver. The spatial mode multiplexer has N input ports and an output port end-couplable to a multimode optical fiber. The multiplexer is configured to preferentially couple light between individual ones of the input ports and corresponding spatial optical modes of the multimode optical fiber. The optical source is connected to a first one of the input ports to launch an optical probe pulse into the fiber. The optical receiver is connected to electrically analyze an optical signal backscattered from the multimode optical fiber and output by a second one of the input ports in response to the launch of the optical probe pulse into the fiber.

20 Claims, 7 Drawing Sheets

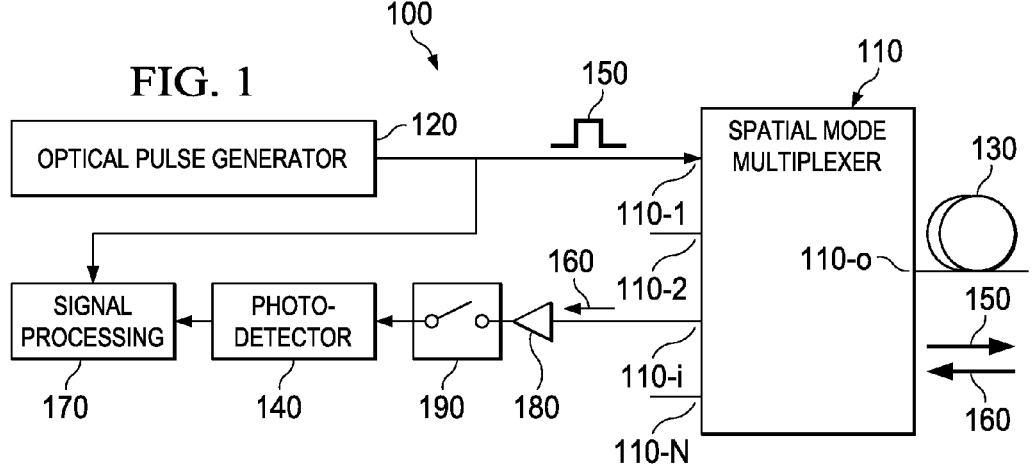
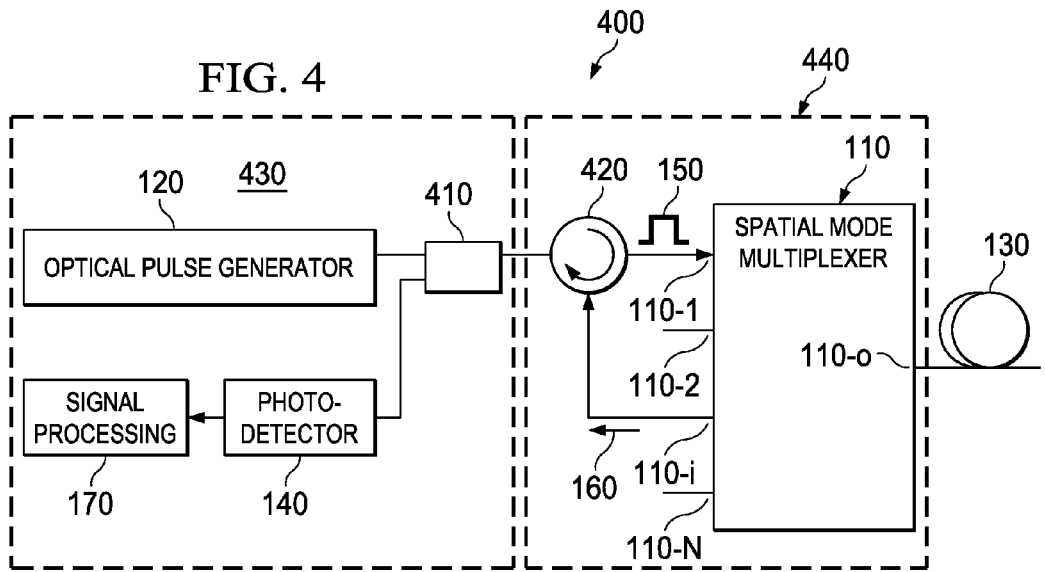

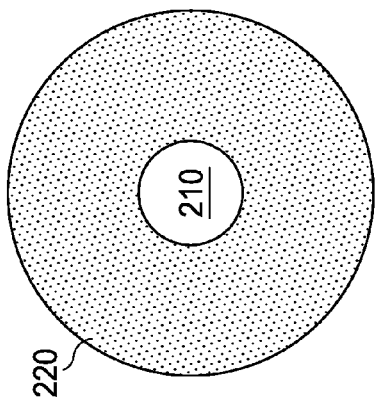
FIG. 2A
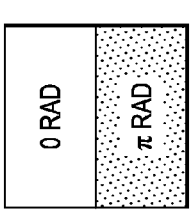 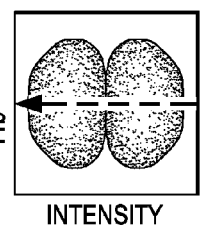
FIG. 2B-a  LP$_{01}$ X-POL
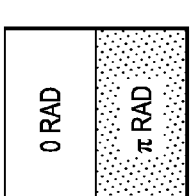 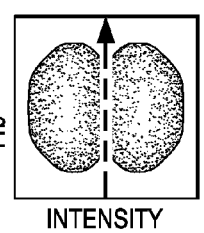
FIG. 2B-b  LP$_{01}$ Y-POL
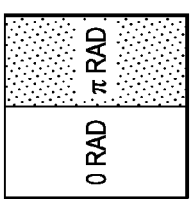 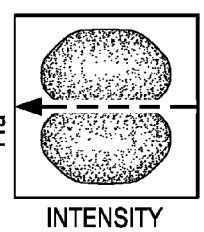
FIG. 2B-c  LP$_{11a}$ X-POL
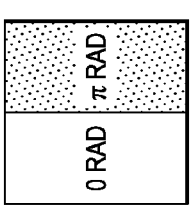 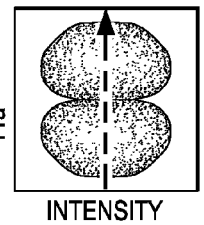
FIG. 2B-d  LP$_{11a}$ Y-POL
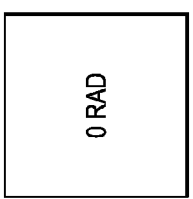 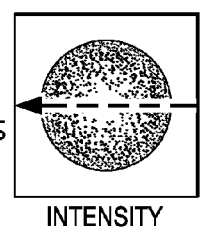
FIG. 2B-e  LP$_{11b}$ X-POL
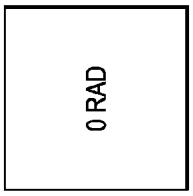 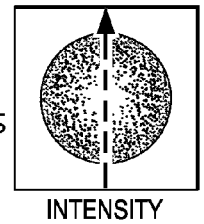
FIG. 2B-f  LP$_{11b}$ Y-POL

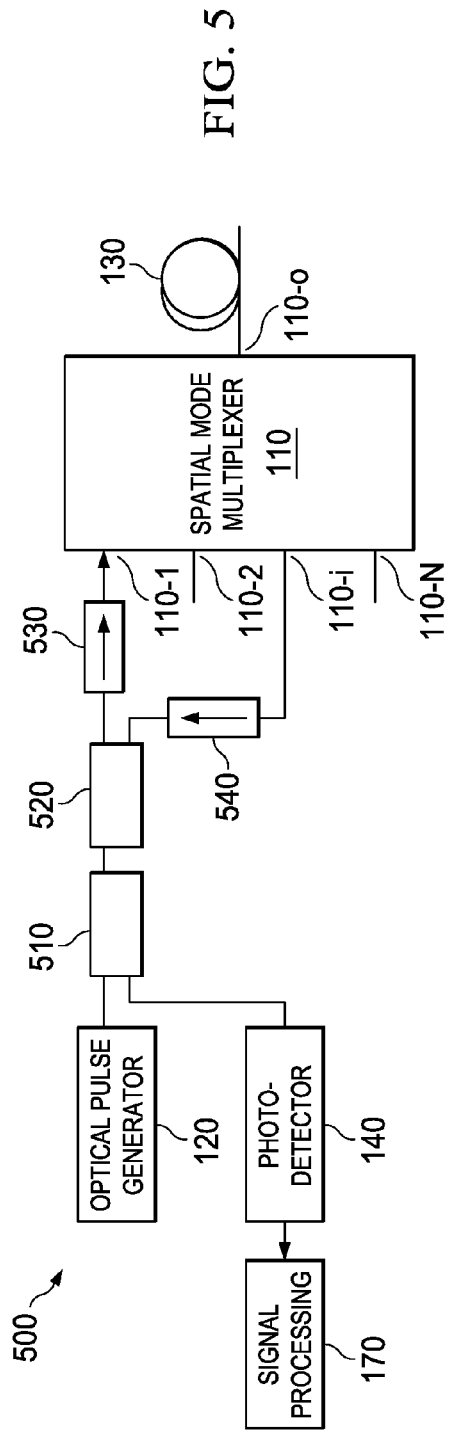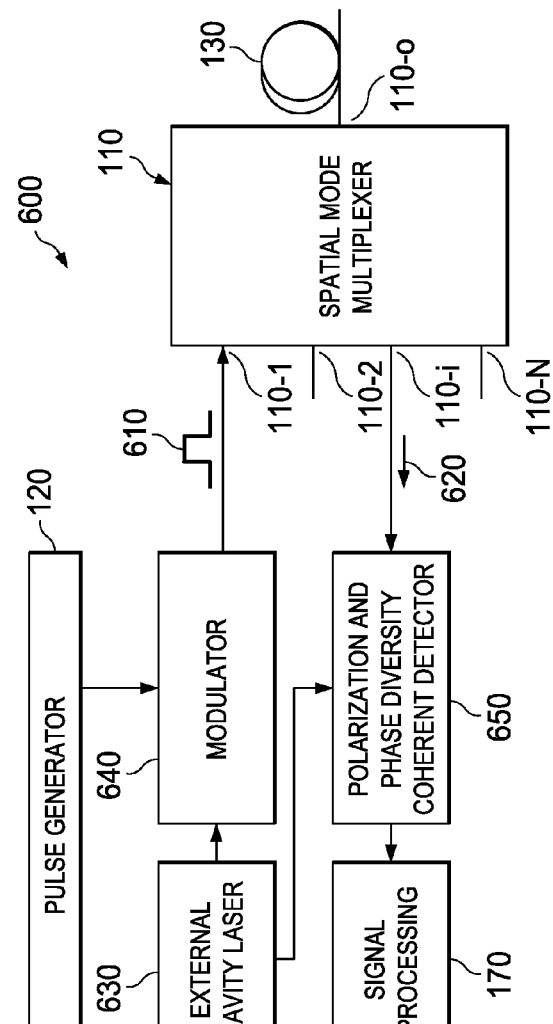

OPTICAL TIME DOMAIN REFLECTOMETRY FOR MULTIPLE SPATIAL MODE FIBERS

TECHNICAL FIELD

This application is directed, in general, to optical communications systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Many optical communications employ single mode optical fibers to guide light signals between optical components. These fibers have a large but limited data transmission capacity. Systems using single mode fibers are nearing the capacity limit of such optical fibers. Therefore, optical fibers that allow transmission via multiple spatial modes are being investigated to increase the capacity of optical networks.

SUMMARY

One aspect provides an apparatus, e.g. an optical time domain reflectometry system. The apparatus includes an N×1 spatial mode multiplexer (SMM), an optical source and an optical receiver. The SMM includes N input ports and an output port end-couplable to a multimode optical fiber. The SMM is configured to preferentially couple light between individual ones of the input ports and corresponding spatial optical modes of the multimode optical fiber. The optical source is connected to one of the input ports to launch an optical probe pulse into the fiber. The optical receiver is connected to electrically analyze an optical signal backscattered from the multimode optical fiber and output by a second one of the input ports in response to the launch of the optical probe pulse into the fiber.

Any embodiment of the apparatus may include the multimode optical fiber optically end-coupled to the output port of the spatial mode multiplexer. Any embodiment may include a circulator configured to receive the probe pulse and the backscattered optical signal. Any embodiment may include one or more optical isolators, with each isolator being optically coupled to a corresponding one of the input ports of the spatial mode multiplexer. Any embodiment may include an optical gate optically coupled between a port of the spatial mode multiplexer and the optical receiver. Any embodiment may include a combiner/splitter optically coupled between the optical source and one of the input ports of the spatial mode multiplexer.

Another aspect provides a method, e.g. for manufacturing an optical time domain reflectometry system. The method includes connecting an optical source to an input port of an N×1 SMM. The SMM has N input ports and has an output port end-couplable to a multimode optical fiber. The spatial mode multiplexer is configured to preferentially couple light between individual ones of the input ports and corresponding spatial optical modes of the multimode optical fiber. The optical source is configured to launch an optical probe pulse into the fiber. The method further includes connecting an optical receiver to electrically analyze an optical signal backscattered from the multimode optical fiber and output by a second one of the input ports in response to the launch of the optical probe pulse into the fiber.

Any embodiment of the method may include configuring a circulator to receive the probe pulse and the backscattered optical signal. Any embodiment may include optically coupling each of one or more optical isolators to each of a corresponding one or more of the input ports of the spatial mode multiplexer. Any embodiment may include optically coupling an optical gate between a port of the spatial mode multiplexer and the optical receiver. Any embodiment may include optically coupling a combiner/splitter between the optical source and an input port of the spatial mode multiplexer.

In any of the above embodiments the optical receiver may include a coherent optical detector. In any of the above embodiments the optical receiver may be configured to demodulate a polarization-diverse backscattered optical signal. In any of the above embodiments the optical source may be configured to produce a phase-diverse and/or polarization-diverse optical probe pulse. In any embodiment the multimode optical fiber may be a step-index multimode fiber or an annular-core multimode fiber.

BRIEF DESCRIPTION

Reference is now made to the following description taken in conjunction with the accompanying drawings, in which:

FIG. 1 illustrates an embodiment of the invention, e.g. a time-domain reflectometer (TDR) in which a spatial mode multiplexer (MMUX) couples a probe pulse from a optical pulse generator into one propagation mode of a multimode optical fiber (MMF), and in which the MMUX couples a backscattered signal from the MMF to an optical signal processor;

FIGS. 2A through 2D illustrate examples of spatial light amplitude profiles of LP modes for step-index multimode optical fibers (FIGS. 2A and 2B), and for annular-core multimode optical fibers (FIGS. 2C and 2D);

Figure 7:
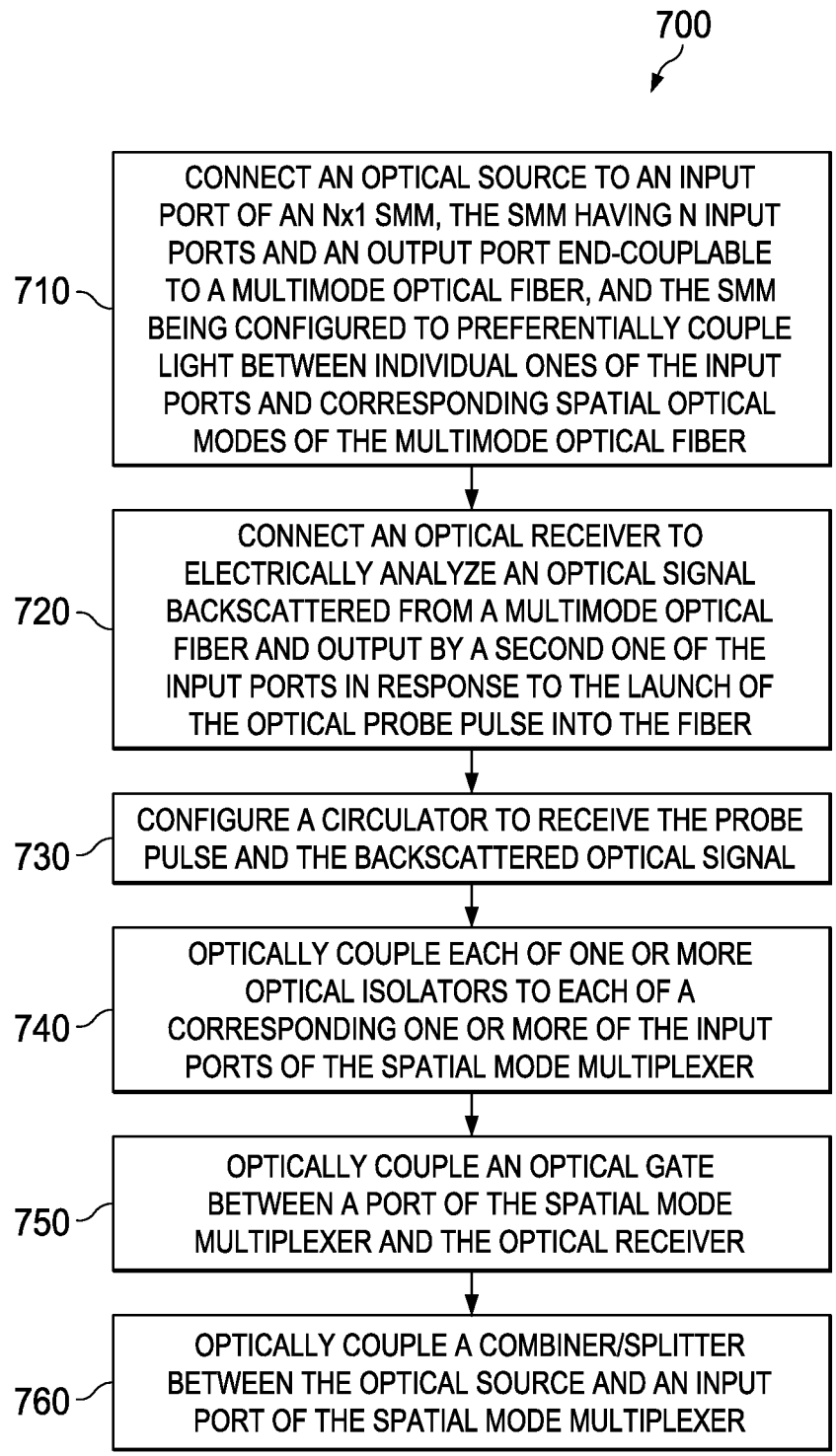

FIGS. 3A-3D schematically illustrate propagation of the probe pulse of FIG. 1 and backscattered light therefrom within an optical fiber, e.g. the MMF of FIG. 1;

FIG. 4 illustrates an embodiment in which a splitter/combiner and circulator couple the probe pulse of FIG. 1 to the MMUX, and couple the backscattered signal from the MMF to the signal processor of FIG. 1;

FIG. 5 illustrates an embodiment in which the circulator of FIG. 4 is replaced by a splitter/combiner and two optical isolators;

FIG. 6 illustrates an embodiment in which a TDR system is configured to couple a polarization and/or phase diversity optical signal to the MMF of FIG. 1, and to receive and analyze a polarization and/or phase diversity backscattered optical signal from the MMF; and FIG. 7 presents a method, e.g. for manufacturing a TDR system according to various embodiments of the disclosure, as described by, e.g. FIGS. 1 and 4-6.

DETAILED DESCRIPTION

Herein, a multi-mode optical fiber is an optical fiber having an orthogonal basis of propagating optical modes, at a frequency in an optical telecommunication band, e.g., the C, L, or S band, wherein the basis includes, at least, two modes with different intensity profiles on a transverse cross-section of the optical fiber. Some multi-mode optical fibers have an orthogonal basis with, at least, four such propagating optical modes with different intensity profiles. Some multi-mode optical fibers have, at least, one such propagating optical mode for which the electric or magnetic field has a magnitude that varies with azimuthal angle over the transverse cross section. A conventional single mode optical fiber is not a multi-mode fiber even though such an optical fiber may have propagating optical modes with different polarizations. Herein multi-mode optical fibers include multi-mode single-core fibers and multi-core optical fibers. These two classes of optical fibers may be referred to herein as multiple spatial-mode optical fibers, more briefly as multiple spatial-mode fibers.

While the propagation modes of such a basis in ideal multiple spatial-mode fibers are nominally orthogonal, some coupling between such modes may occur in real multiple spatial-mode optical fibers. Material non-idealities such as defects, inclusions, roughness, cross-section variations, and impurities may cause light propagating in one spatial mode to couple to another nominally orthogonal spatial mode. Moreover, physical effects unrelated to defects, such as Rayleigh scattering, may provide coupling between spatial modes. These effects may limit the length of a span using a multiple spatial-mode fiber to a maximum length above which signals in different modal transmission channels may need to be regenerated and relaunched periodically. Hence, the need exists for the ability to characterize the interaction between the propagating modes of real multiple spatial-mode fibers.

Herein various embodiments are described for apparatus and methods for characterizing spatial mode interactions in multiple spatial-mode fibers. Some such embodiments employ a spatial mode multiplexer (SMM) to launch an optical pulse, referred to as a probe pulse, substantially or primarily into one spatial propagating mode of a spatial-mode fiber. The SMM is then used to detect light that has coupled to other spatial propagating modes of an orthogonal mode basis for the fiber. Such apparatus and methods may be beneficial in various contexts, including optical fiber research and manufacturing, and maintenance of installed optical fiber transmission systems. In one nonlimiting example, embodiments described herein may be used to characterize the distribution of optical fields in different spatial modes of a multiple spatial-mode fiber.

Turning to FIG. 1, illustrated is a system 100 according to one representative embodiment of the invention. The system includes an optical spatial-mode multiplexer, i.e., herein referred to as a mode multiplexer (MMUX), 110. The MMUX 110 includes a plurality of input ports 110-1, 110-2, ... 110-$i$, ... 110-N, and an output port 110-$o$. As appreciated by those skilled in the pertinent art, such a multiplexer may be used to combine multiple input signals to a single output signal, or to demultiplex a single spatial-mode multiplexed optical signal to multiple individual signals. In recognition of this bidirectionality, each of the input ports 110-1, ... 110-N and the output port 110-$o$ may be referred to simply as a "port" without loss of generality.

A first input port of the MMUX 110, e.g. port 110-1, is optically coupled to an optical pulse generator 120. The output port 110-$o$ is optically coupled to a multimode optical fiber, or MMF, 130. A second input port of the MMUX 110, e.g. port 110-$i$, is optically coupled to a photodetector 140. The MMUX 110 is configured to couple light input to any of its N input ports to the output port 110-$o$. The light presented to each input port may be substantially or primarily coupled to a different spatial propagation mode of the MMF 130.

FIG. 2A illustrates one nonlimiting embodiment in which the MMF 130 is a step-index multimode fiber. Herein a step-index fiber includes an optical core 210 whose refractive index is substantially spatially constant over the lateral profile of the optical core. An optical cladding 220 has a lower refractive index than the core 210.

FIG. 2B-$a$ through 2B-$f$ illustrate six different, propagation modes of an orthogonal mode basis that may be approximately supported by an example step-index MMF having a low core-cladding refractive index contrast. Three spatial modes are represented in figure pairs 2B-a and 2B-b ($LP_{01}$), 2B-c and 2B-d ($LP_{11a}$), and 2B-e and 2B-f ($LP_{11b}$). Two polarization modes are represented by FIGS. 2B-$a$, 2B-c and 2B-e (X) and 2B-b, 2B-d and 2B-f (Y). The upper illustration of each figure represents the spatial intensity and polarization modes, while the lower illustration represents the phase of each illustrated spatial mode intensity lobe. Relatively large amplitude regions are indicated via dark regions in the upper illustrations, and relatively small amplitude regions are indicated via white regions. Thus the example step-index MMF may approximately support at least three such LP spatial propagation modes. In some embodiments, not shown, the MMF 130 may be a graded-index multimode fiber. Those skilled in the pertinent art will appreciate that the similar principles as described for the step-index MMF may be applied to the graded-index MMF.

Figure 2C:
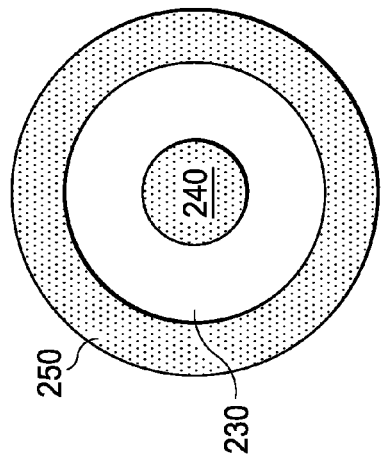

FIG. 2C illustrates one nonlimiting embodiment in which the MMF 130 has a ring-like core profile, i.e., an annular-core MMF. Herein an annular-core fiber includes a core 230 with an annular-like cross-section. By annular-core, it is meant that the core 230 has an inner non-zero diameter and a greater outer diameter, and is approximately circular symmetric. An inner cladding 240 may, in some embodiments, fill the interior volume inside the annular core 230, and an outer cladding 250 typically surrounds the annular core 230.

Figure 2D:
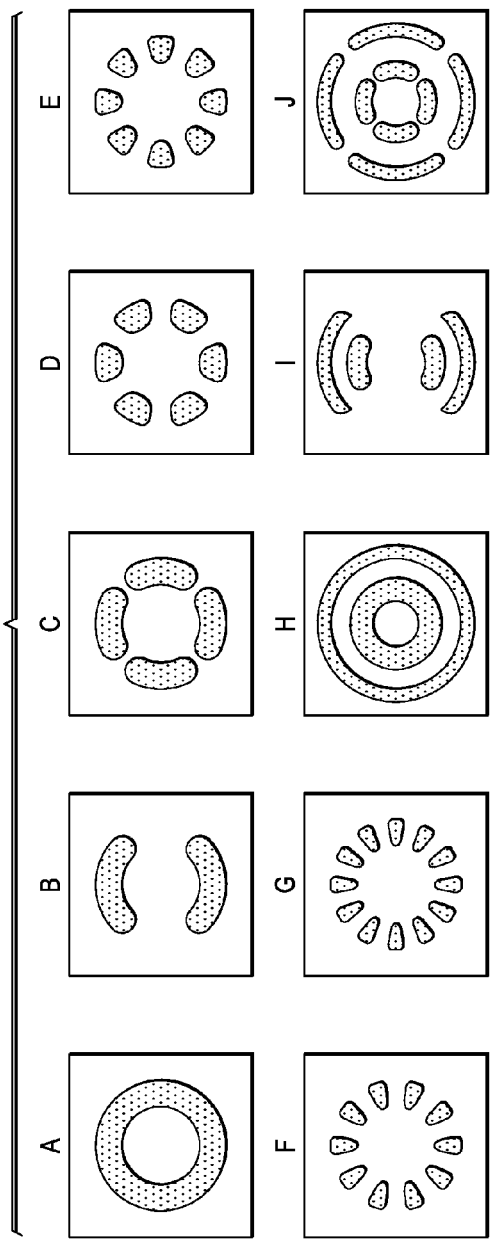

FIG. 2D schematically illustrates spatial light amplitude profiles of a relatively orthogonal spatial propagating optical modes A, B, C, D, E, F, G, H, I, and J of a mode basis for an example in which the MMF 130 has an annular optical core. Here, relatively large amplitude regions are indicated schematically via dark regions and relatively small amplitude regions are indicated schematically via white regions. Each of the spatial modes may propagate in one of two polarization modes, e.g. radial polarization or azimuthal polarization for some of the modes.

In a nonlimiting example, each of the input ports of the MMUX 110 may couple substantially, primarily, or almost completely to a corresponding one of the spatial propagation modes of the MMF 130 or to a correspond LP mode therefor, e.g., as exemplified by the propagating modes of FIG. 2B or FIG. 2D. Conversely, optical signals received at the output port 110-$o$, from one of the spatial propagating modes of the orthogonal mode basis of the MMUX 110, may be substantially, primarily, or almost completely directed to a corresponding one of the ports 110-1, 110-2, ... 110-N. The MMUX 110 is configured to substantially, primarily, or almost completely couple light signals between each port 110-1, ... 110-N and a corresponding one of the spatial propagating modes of the MMF 130. Details regarding some embodiments of the MMUX 110 may be found in U.S. patent application Ser. No. 13/200,072 to Roland Ryf, filed Sep. 16, 2011, incorporated herein by reference in its entirety, and Roland Ryf, et al., "Optical Coupling Components for Spatial Multiplexing in Multi-Mode Fibers," 2011 37th European Conference and Exhibition on Optical Communication (ECOC), pp. 1-3, 18-22 Sep. 2011, incorporated herein by reference in its entirety.

In various embodiments, the N×1 MMUX 110 may produce such a one-to-one substantial, primary, or almost complete coupling between a port 110-1, ... 110-N and a corresponding LP or actual optical spatial mode of the MMF 130 in a polarization-independent manner or alternately in a polarization-sensitive manner.

Briefly described without limitation, the MMUX 110 may receive optical signals at the ports 110-1, . . . 110-N from multiple incoming beams or single mode fibers, and combine the signals such that every incoming signal is substantially, primarily or almost exclusively coupled to a different, nominally orthonormal, basis mode of the MMF 130. Light beams coupling to the ports 110-1, . . . 110-N may be subjected to an additional corresponding spatially varying phase profile, e.g., as illustrated in the bottom portions of FIGS. 2B-a to 2B-f, by reflecting such a light beam off or transmitting such a light beam through a corresponding thin hologram or a corresponding phase plate. Such a thin hologram or phase plate however, can typically only generate the appropriate spatial phase modulation for one mode or a few modes at a time. Therefore beam splitters may be used to combine the modes generated by the thin holograms corresponding to each of the received signals.

An alternative embodiment of the MMUX 110 may employ a liquid-crystal on silicon (LCOS) phase-only spatial light modulator (SLM) to produce dynamically programmable spatially varying, phase modulation of a light beam. Some such embodiments may allow the construction of a coupler that can be reprogrammed to effectively couple light received at one of the input ports 110-1, . . . 110-N to different LP or actual spatial propagating modes of the fiber during operation, and/or correct for aberration and misalignments of the optical components. Furthermore, such LCOS-based SLMs can be used to effectively modify both the spatial phase profile and the spatial amplitude profile of an optical beam at the ports of the MMUX, such as by phase contrast methods, well known in the photolithography arts.

Returning to FIG. 1, when the pulse generator 120 outputs a probe pulse 150, the pulse 150 is usually substantially, primarily, or almost exclusively coupled to one of the spatial propagating modes of the MMF 130 or an orthogonally polarized pair of such modes of the MMF 130 by the MMUX 110. In the illustrated embodiment, the probe pulse 150 is input to the port 110-1. Thus, for example, the probe pulse 150 may be coupled primarily or almost exclusively to the spatial propagating mode A in FIG. 2D. As the probe pulse 150 propagates along the MMF 130, some optical energy may be transferred to one or more of the other spatial propagating modes in the nominally orthogonal mode set of the MMF 130. A portion of this transferred light may couple in a direction back to the MMUX 110. Such light is referred to herein as being "backscattered", and is referred to as a backscattered optical signal 160. When the backscattered signal 160 is received at the port 110-o, the MMUX 110 substantially, primarily, or almost exclusively couples such light, which is backscattered into a particular spatial propagating mode, i.e., according to the embodiment of the MMUX 110, to the input port corresponding to that particular spatial propagating mode.

In a more specific example, FIG. 1 illustrates a case in which the backscattered signal 160 is substantially, primarily, or almost exclusively coupled to an $i^{th}$ spatial propagating mode of the MMF 130, which corresponds to the port 110-i. The backscattered signal 160 then travels to the photodetector 140 where it is converted to the electrical domain for analysis by a signal processor 170. The photodetector 140 may be an optical intensity detector, where only optical power information is provided. The signal processor also may receive the probe pulse 150 as a reference. For example, the processor 170 may synchronize the time when the probe pulse 150 is launched into the MMF 130 with the time when the backscattered signal 160 is received. The signal processor 170 may thus determine from the probe pulse 150 and the backscattered signal 160 the characteristics of coupling between the first spatial propagation mode and the $i^{th}$ spatial propagation mode from the received signal. Optionally an amplifier 180 may amplify the backscattered signal 160, as the intensity of the backscattered light may be 5-6 orders of magnitude (50-60 dB) below the intensity into which the probe pulse 150 is launched.

Figure 3A:
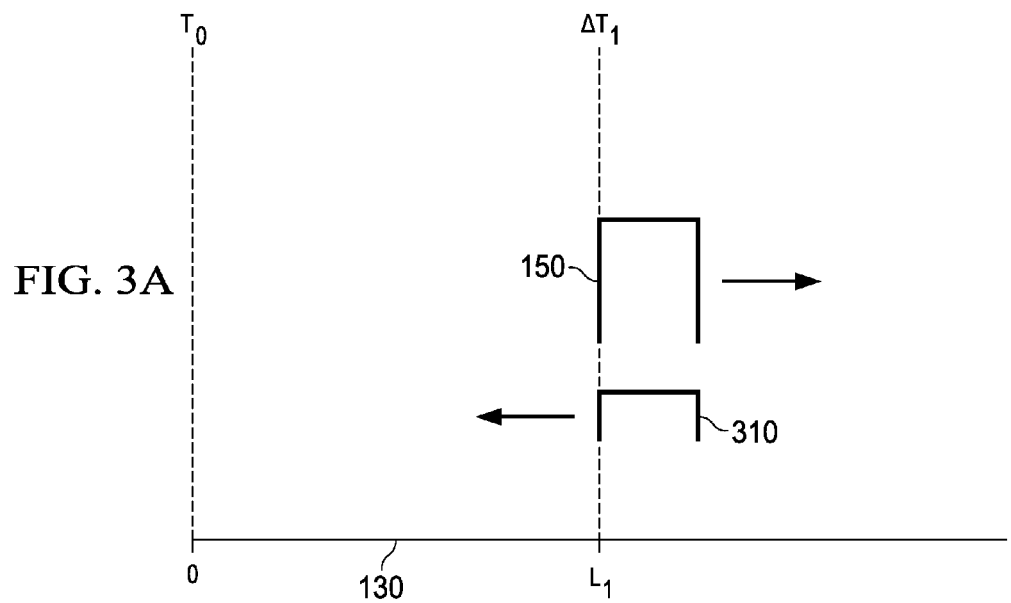
Figure 3B:
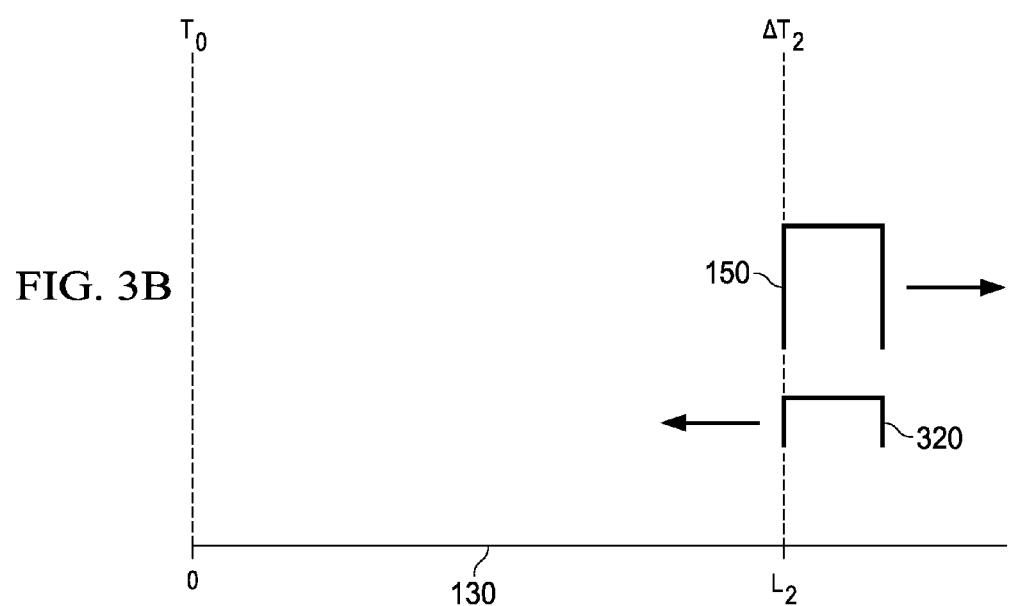
Figure 3C:
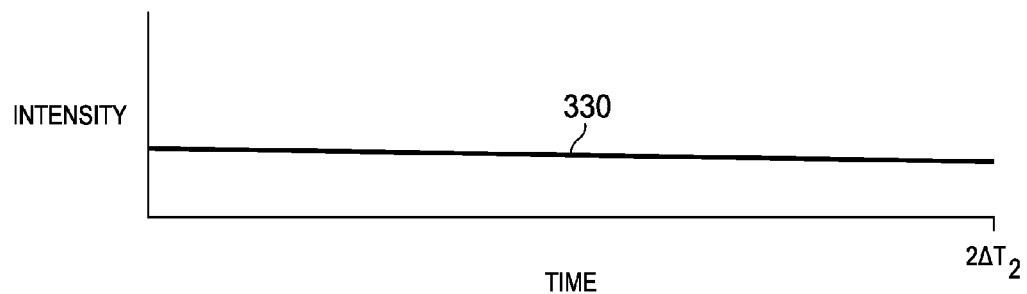

FIGS. 3A-3D schematically illustrate several examples of interactions between the probe pulse 150 and the optical MMF 130. Referring first to FIG. 3A, the probe pulse 150 is launched at a time $T_0$. At a time instant $\Delta T_1$, the probe pulse has reached a point $L_1$ along the MMF 130. The probe pulse 150 may transfer a portion of its energy to another spatial propagating mode of the MMF 130, e.g. the $i^{th}$ mode, via any of the forward and/or back scattering mechanisms discussed above. For the purpose of this example, the light is assumed to be transferred via Rayleigh scattering. As a result, a backscattered pulse 310 propagates via the $i^{th}$ mode back toward port 110-o, reaching the port 110-o at time $2\Delta T_1$. At a later time instant $\Delta T_2$, the probe pulse 150 reaches a point $L_2$ along the MMF 130. A backscattered pulse 320 propagates via the $i^{th}$ mode back to the port 110-o, reaching the port 110-o at time $2\Delta T_2$. As the probe pulse 150 propagates along the MMF 130, a continuous optical signal may be generated backwards in the direction of the port 110-o, with the timeframe of the backscattered signal being twice the travel time of the probe pulse 150 along the MMF 130 due to path length doubling. Thus, a signal qualitatively similar to a backscattered signal 330 may be produced by the probe pulse 150. In the absence of any localized defects or discontinuities in the optical characteristics of the MMF 130, the backscattered signal 330 may be relatively smooth, and may decline in intensity as the probe pulse 150 intensity decreases. Because the Rayleigh scattering effect is fairly weak, the intensity of the backscattered signal 330 may be about a factor of $1 \times 10^{-6}$ or less, or even a factor of $1 \times 10^{-8}$ or less, times the intensity of the probe pulse 150 at its initial introduction into the MMF 130.

The backscattered signal 330 may be representative of coupling between the first spatial propagation mode of the MMF 130 (e.g. mode A of FIG. 2D) and the $i^{th}$ spatial propagation mode of the MMF 130 (e.g. mode F of FIG. 2D). However, the coupling between the first spatial propagation mode and the other spatial propagation modes may be different. Thus, by coupling the photodetector 140 to each of the inputs ports 110-2, . . . 110-i, . . . 110-N the coupling between the first spatial propagation mode and each of the other spatial propagation modes may be characterized. The pulse generator 120 may be sequentially coupled to each of the other ports 110-2, . . . 110-i, . . . 110-N in turn to characterize the coupling between each particular forward propagating spatial propagation mode and each of the other spatial propagation modes. Such information may be useful for fundamental characterization of the propagation characteristics of the various fiber spatial propagation modes, such as for a candidate fiber design.

Figure 3D:
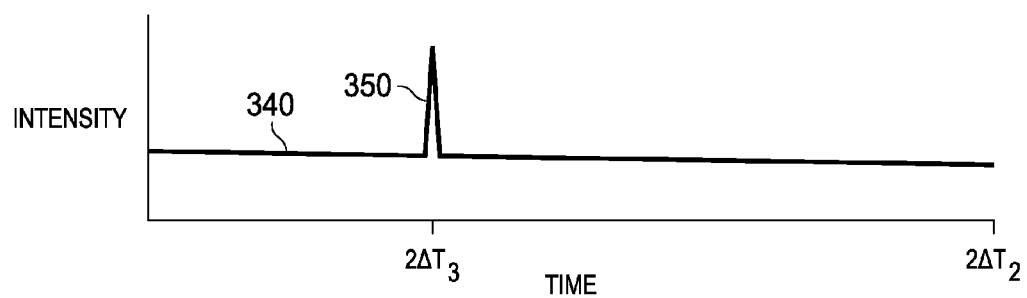

In some cases the MMF 130 may not have uniform reflection characteristics. As noted earlier, the fiber may include a longitudinally localized defect or longitudinally local optical discontinuity. In such cases the scattered light signal may be nonuniform with respect to time (or equivalently with respect to distance along the MMF 130). In FIG. 3D, a scattering characteristic 340 includes a scattering feature 350 coincident with the discontinuity. The timing of the scattering feature 350 provides an indication of the location of the discontinuity in the MMF 130. For example, the scattering feature may arrive at the signal at a time $\Delta T_3$. This time may correspond to a distance $L_3$ along the fiber 130 at which the defect is located. Characterization of the coupling between each combination of spatial propagation modes of the MMF 130 may provide physical insights into the nature and effect of more subtle optical discontinuities in an actual multiple spatial-mode fiber 130 that cause localized variation in the coupling between the multiple special modes of the fiber 130. Moreover, in optical communications systems, the ability to detect such discontinuities may provide an important diagnostic tool for detection and repair of defects or failures in optical fibers. While currently available techniques lack the ability to operate on multiple spatial-mode fibers, embodiments of the disclosure provide such ability.

Referring back to FIG. 1, an optical gate 190 may be located between the amplifier 180 and the port 110-$i$. The gate 190 may be used to sample light from a discrete portion of the MMF 130. For example, the gate 190 may be controlled to couple the MMUX 110 to the amplifier 180 at the beginning of a temporal sampling window, and may be controlled to decouple the MMUX 110 from the amplifier 180 at the end of the temporal sampling window. The timing and duration of the temporal sampling window may be varied to localize the longitudinal scattering source of the received backscattered optical signal and/or to incrementally scan the length of the MMF 130.

FIG. 4 illustrates a system 400 according to another embodiment. The system 400 includes a three-port splitter/combiner 410 and an optical circulator 420. In this embodiment, the forward propagating probe pulse 150 and the backscattered signal 160 share a single port of the splitter/combiner 410. Thus, the probe pulse is routed by the splitter/combiner 410 and the circulator 420 to the port 110-1. The backscattered signal 160 is routed by the circulator 420 and the splitter/combiner 410 from the port 110-$i$ to photodetector 140 via the same port 110-1. Optionally in the system 400 the path of the backscattered signal 160 between the MMUX 110 and the photodetector 140 may include an optical and/or electrical amplifier, e.g. such as the amplifier 180, to increase the signal level of the backscattered signal 160. Also optionally, the same path may include a controllable timing gate, e.g. such as the gate 190, for controlling the sampling time and/or sampling duration of the backscattered signal 160.

The system 400 may be configured such that the pulse generator 120, photodetector 140, signal processor 170 and splitter/combiner 410 are contained within a common housing 430. The circulator 420 and the MMUX 110 may be contained within a second housing 440. The single connection between the splitter/combiner 410 and the circulator 420 then provides a single optical path through which the housings 430 and 440 may be coupled, significantly simplifying configuration of the system 400 for use.

FIG. 5 illustrates a system 500 that is an embodiment in which the circulator 420 is replaced by a splitter/combiner 520 and two isolators 530, 540. While this configuration increases the component count relative to the system 400, the isolators 530 and 540 are expected to provide greater crosstalk and/or noise extinction than the circulator 420, thereby providing superior performance for the system 500 relative to the system 400. Furthermore, the configuration of FIG. 5 provides a single optical connection between the splitter/combiners 510 and 520 such that the components of the system 500 may be located in easily configured housings as described for the system 400.

In some embodiments the system 500 may be used to characterize backscattered light that propagates via the same propagation mode as the probe pulse 150 is coupled to. This may be done, for example, by bypassing the isolator 530 to route the backscattered light from the input port 110-1 to the splitter combiner 520, and disconnecting the isolator 540 from the splitter/combiner 520. Thus, the system 500 may be easily reconfigured for testing of backscatter in single mode fibers, or backscatter in a multimode fiber in the same propagation mode of the probe pulse 150.

FIG. 6 illustrates an embodiment of a system 600 in which the MMF 130 may be characterized as a function of the phase and/or polarization of light propagating therein. A phase-diverse and/or polarization-diverse probe pulse 610 may be launched into the MMF 130, and a phase diverse and/or polarization-diverse backscattered signal 620 may be received from the MMF 130. An optical source 630, e.g. an external cavity laser (ECL), provides a light source to a modulator 640 and a local optical reference, or local oscillator (LO) to a coherent detector 650. The modulator 640 receives the output of the pulse generator 120. In some embodiments the modulator 640 produces the probe pulse 610 including phase diversity components, e.g. in-phase and quadrature components. In some embodiments the modulator 640 produces the probe pulse 610 including polarization diversity components, e.g. horizontal (H) and vertical (V) polarization components. In some embodiments the modulator 640 produces the probe pulse 610 including both phase-diversity and polarization diversity components. The modulated probe pulse 610 is coupled by the MMUX 110 to a desired LP or spatial propagation mode of the MMF 130, e.g. mode A (See FIG. 2D). The MMUX 110 then directs the backscattered signal 620 from, e.g. the port 110-$i$, to the coherent detector 650. The coherent detector 650 may demodulate the backscattered signal 620 to recover selected polarization and/or phase components. The signal processor 170 may then analyze these components via optical interference with light from the local optical reference or the local optical oscillator (LO) to characterize interactions between the spatial propagation modes of the MMF 130 as a function of phase and/or polarization.

Turning to FIG. 7, presented is a method 700, e.g. for forming an apparatus, e.g. an optical time domain reflectometer according to various embodiments. The steps of the method 700 are described without limitation by reference to elements previously described herein, e.g. in FIGS. 1-6. The steps of the method 700 may be performed in another order than the illustrated order and/or in parallel.

A step 710 of the method 700 includes connecting an optical source, e.g. the optical pulse generator 120, to an input port of an N×1 SMM, e.g. one of the ports 110-1 . . . 110-N. The multiplexer has N input ports and has an output port end-couplable to a multimode optical fiber, e.g. the MMF 130. The multiplexer is configured to preferentially couple light between individual ones of the input ports and corresponding spatial optical modes of the multimode optical fiber. The optical source is configured to launch an optical probe pulse into the fiber. In a step 720 an optical receiver, e.g. the photodetector 140 and the signal processor 170, is connected to electrically analyze an optical signal backscattered from the multimode optical fiber and output by a second one of the input ports in response to the launch of the optical probe pulse into the fiber.

Any embodiments of the method 700 may include a step 730, in which a circulator, e.g. the circulator 420, is configured to receive the probe pulse and the backscattered optical signal. Any embodiment may include a step 740, which includes optically coupling each of one or more optical isolators, e.g. the isolator 520, to each of a corresponding one or more of the input ports of the spatial mode multiplexer. Any embodiment may include a step 750, in which an optical gate, e.g. the optical gate 190, is optically coupled between a port of the spatial mode multiplexer and the optical receiver. Any embodiment may include a step 760, which includes optically coupling a combiner/splitter, e.g. the splitter/combiner 410, between the optical source and a port of the spatial mode multiplexer.

In any of the above-described embodiments of the method 700, the optical receiver may include a coherent optical detector. In any of the embodiments of the method 700 the optical receiver may be configured to demodulate a polarization-diverse backscattered optical signal. In any of the embodiments of the method 700 the multimode optical fiber may be a step-index multimode fiber or an annular-core multimode fiber. In any of the embodiments of the method 700 the optical source may be configured to produce a phase-diverse and/or polarization-diverse optical probe pulse.

Those skilled in the art to which this application relates will appreciate that other and further additions, deletions, substitutions and modifications may be made to the described embodiments.

What is claimed is:

1. An apparatus comprising:
   an N×1 spatial mode multiplexer having N input ports and having an output port end-couplable to a multimode optical fiber, the multiplexer being configured to preferentially couple light between individual ones of the input ports and corresponding spatial optical modes of the multimode optical fiber;
   an optical source connected to a first one of said input ports to launch an optical probe pulse into the fiber; and
   an optical receiver connected to electrically analyze an optical signal backscattered from said multimode optical fiber and output by a second one of the input ports in response to the launch of the optical probe pulse into the fiber.

2. The apparatus of claim 1, further comprising said multimode optical fiber optically end-coupled to said output port of the spatial mode multiplexer.

3. The apparatus of claim 2, wherein said multimode optical fiber is a step-index multimode fiber.

4. The apparatus of claim 1, further comprising a circulator configured to receive said probe pulse and said backscattered optical signal.

5. The apparatus of claim 1, further comprising one or more optical isolators, each isolator being optically coupled to a corresponding one of the input ports of said spatial mode multiplexer.

6. The apparatus of claim 1, further comprising an optical gate optically coupled between a port of said spatial mode multiplexer and said optical receiver.

7. The apparatus of claim 1, wherein said optical receiver comprises a coherent optical detector.

8. The apparatus of claim 1, wherein said optical receiver is configured to demodulate a polarization-diverse backscattered optical signal.

9. The apparatus of claim 1, further comprising a combiner/splitter optically coupled between said optical source and one of the input ports of said spatial mode multiplexer.

10. The apparatus of claim 1, wherein said optical source is configured to produce a phase-diverse and/or polarization-diverse optical probe pulse.

11. A method comprising:
    connecting an optical source to an input port of an N×1 spatial mode multiplexer having N input ports and having an output port end-couplable to a multimode optical fiber, said spatial mode multiplexer being configured to preferentially couple light between individual ones of the input ports and corresponding spatial optical modes of the multimode optical fiber, and said optical source being configured to launch an optical probe pulse into the fiber; and
    connecting an optical receiver to electrically analyze an optical signal backscattered from said multimode optical fiber and output by a second one of the input ports in response to the launch of the optical probe pulse into the fiber.

12. The method of claim 11, further comprising configuring a circulator to receive said probe pulse and said backscattered optical signal.

13. The method of claim 11, further comprising optically coupling each of one or more optical isolators to each of a corresponding one or more of the input ports of said spatial mode multiplexer.

14. The method of claim 11, further comprising optically coupling an optical gate between a port of said spatial mode multiplexer and said optical receiver.

15. The method of claim 11, further comprising optically coupling a combiner/splitter between said optical source and an input port of said spatial mode multiplexer.

16. The method of claim 11, wherein said optical receiver comprises a coherent optical detector.

17. The method of claim 11, wherein said optical receiver is configured to demodulate a polarization-diverse backscattered optical signal.

18. The method of claim 11, wherein said multimode fiber is a step-index multimode fiber.

19. The method of claim 11, wherein said optical source is configured to produce a phase-diverse optical probe pulse.

20. The method of claim 11, wherein said optical source is configured to produce a polarization-diverse optical probe pulse.

* * * * *